United States Patent
Razniewski et al.

(10) Patent No.: US 11,783,202 B2
(45) Date of Patent: Oct. 10, 2023

(54) METHOD FOR PREDICTING A PERSISTENCE OVER TIME OF ENTRIES OF A KNOWLEDGE BASE

(71) Applicant: Robert Bosch GmbH, Stuttgart (DE)

(72) Inventors: Simon Razniewski, Saarbruecken (DE); Ioannis Dikeoulias, Saarbruecken (DE); Jannik Stroetgen, Karlsruhe (DE)

(73) Assignee: ROBERT BOSCH GMBH, Stuttgart (DE)

(*) Notice: Subject to any disclaimer, the term of this patent is extended or adjusted under 35 U.S.C. 154(b) by 1016 days.

(21) Appl. No.: 16/667,673

(22) Filed: Oct. 29, 2019

(65) Prior Publication Data
US 2020/0202228 A1    Jun. 25, 2020

(30) Foreign Application Priority Data
Dec. 19, 2018    (DE) .......................... 102018222344.0

(51) Int. Cl.
*G06N 5/02* (2023.01)
*G06N 5/04* (2023.01)
*G06N 20/00* (2019.01)

(52) U.S. Cl.
CPC ................. *G06N 5/02* (2013.01); *G06N 5/04* (2013.01); *G06N 20/00* (2019.01)

(58) Field of Classification Search
None
See application file for complete search history.

(56) References Cited

U.S. PATENT DOCUMENTS

| | | |
|---|---|---|
| 2018/0075145 A1 | 3/2018 | Zhao et al. |
| 2018/0188045 A1 | 7/2018 | Wheeler et al. |

OTHER PUBLICATIONS

Alemu, A Theory of Digital Library Metadata: The emergence of Enriching and Filtering, Doctoral Thesis, University of Portsmouth, 2014, pp. 1-267 (Year: 2014).*
Tanon and Kaffee: "Property Label Stability in Wikidata: Evolution and Convergence of Schemas in Collaborative Knowledge Bases", Proceedings of WWW 2018 Companion,The Web Conference, Lyon, France, pp. 1801-1803.
Dikeoulias, I., et al., "Epitaph or Breaking News? Analyzing and Predicting the Stability of Knowledge Base Properties", International World Web Conference Committee, San Franciso, CA, USA, Bearing a Date of 2019, pp. 1155-1158.
Dikeoulias, Ioannis, "Analyzing and Predictingthe Stability of Knowledge Base Properties", Max Planck Institute for Informatics, Department for Database and Information Systems, Bearing a Date of 2018, pp. I-126.

* cited by examiner

*Primary Examiner* — Wilbert L Starks
(74) *Attorney, Agent, or Firm* — NORTON ROSE FULBRIGHT US LLP; Gerard Messina

(57) ABSTRACT

A method for predicting a persistence over time of entries of a knowledge base variable over time, the knowledge base including triples of entities, property identifiers of properties of the respective entities, and expressions of these respective properties, the prediction being made as a function of an output value of a classifier, and the classifier being trained as a function of triples that are present in the knowledge base at two different points in time separated by a time interval, to output the output value that characterizes for a predefinable triple whether or not the expression stored in the triple is stable over this time interval.

11 Claims, 2 Drawing Sheets

METHOD FOR PREDICTING A PERSISTENCE OVER TIME OF ENTRIES OF A KNOWLEDGE BASE

FIELD

The present invention relates to a method for predicting a persistence over time of entries of a knowledge base which is variable over time, a method for ascertaining a route using a navigation system, a method for the automated control of an at least partially autonomous robot, a computer program, a machine-readable memory medium, and a computer.

BACKGROUND INFORMATION

A method for generating a query dataset from a knowledge base with a multitude of instructions is described in U.S. Patent Application Publication No. 2018 075 145 A. The method includes generating at least one query template based on a structure of selected instructions from the multitude of instructions; generating a source query for each selected instruction based on the at least one query template with the aid of a processor; generating at least one first extension query using a search engine in that each of the seed queries is processed by the search engine; and storing at least one of the at least one first extension queries and the source queries in a first memory as a query dataset.

SUMMARY

Knowledge bases include triples of entities, property identifiers of properties of the respective entities, and expressions of these respective properties, e.g., in text form.

For a multitude of applications it is advantageous to extract information that is stored in the knowledge base.

Knowledge bases that are variable over time are characterized in that entries of entities and properties are able to be added or changed. For a robust application it is then important to be able to assess whether or not a property of an entity in the knowledge base will be unchanged at a future point in time. This possibility is provided by an example method in accordance with the present invention.

Advantageous further developments of the present invention are described herein.

In a first aspect, the present invention therefore relates to an (in particular computer-implemented) method for predicting, i.e., for making a prediction, regarding a persistence over time of entries of a knowledge base which is variable over time, the knowledge base including triples of entities (encoded as a feature vector, for example), property identifiers of properties of the respective entities, and expressions of these respective properties, the prediction being made as a function of an output value of a classifier, the classifier being trained as a function of triples that are present in the knowledge base at two different points in time separated by a time interval, to output the output value that characterizes for a predefinable triple whether or not the predefinable property stored in the triple is stable over this time interval.

It was recognized that it is possible to learn a prediction regarding the future persistence over time of entries of the knowledge base with the aid of two snapshots of the knowledge base of two different points in time.

This is based on the understanding that the persistence over time of entries in knowledge bases which are variable over time may have two causes. For one, the actual expression of a property may have changed, and for another, it is possible that the representation of the actual expression within the knowledge base was adapted. It was now recognized that a reliable prediction of the persistence over time is possible nonetheless based solely on the entries in the knowledge base at the two different points in time.

In this context it may be provided that the classifier is trained as a function of whether or not the respective expression for the triples present at these two different points in time assumes the same value.

In other words, it is possible to make a prediction about the future persistence over time of all entries in the knowledge base on the basis of the change or the absence of a change of only a few entries that exist in the knowledge base at these two different points in time.

It may preferably be provided that the classifier includes a logistic regression, the parameters of which are adapted during the training. A logistic regression is particularly well suited to make a determination, using a binary classification, as to whether or not the expressions have changed.

It is also possible to use other machine learning methods in the classifier, e.g., decision trees or a support vector machine.

In a further aspect, the present invention relates to a method for generating a robust knowledge base in that a prediction of its persistence is ascertained for entries, i.e., triples including entities, property identifiers of properties of the respective entities, and expressions of these respective properties of a knowledge base that is made available, with the aid of one of the previously mentioned methods, and the 4-tuple including the triple and the associated prediction is made available in the robust knowledge base.

In an alternative further development of the present invention, a method for ascertaining a route using a navigation system is provided, the route being ascertained as a function of at least one entry of a knowledge base including a triple from an entity, a property identifier of a property of the entity, and an expression of this property, the route being ascertained as a function of a prediction of the persistence of this property, and the prediction being ascertained with the aid of one of the aforementioned methods.

In this way it is particularly easy to ensure a reliable route planning.

In a further development, it may be provided that this triple is not taken into account for an ascertainment of the route if the prediction shows that the information included in this triple is not persistent.

This makes it possible to ensure a consistency in the route planning in a particularly uncomplicated manner.

In a further development of the two previously mentioned methods, a method may be provided for the automated control of an at least partially autonomous robot, in particular of a motor vehicle, and a route is ascertained using one of the two previously mentioned methods, and the at least partially autonomous robot is then controlled along at least a section of this route.

Below, specific embodiments of the present invention are described in greater detail with reference to the figures.

DETAILED DESCRIPTION OF EXAMPLE EMBODIMENTS

Figure 1:
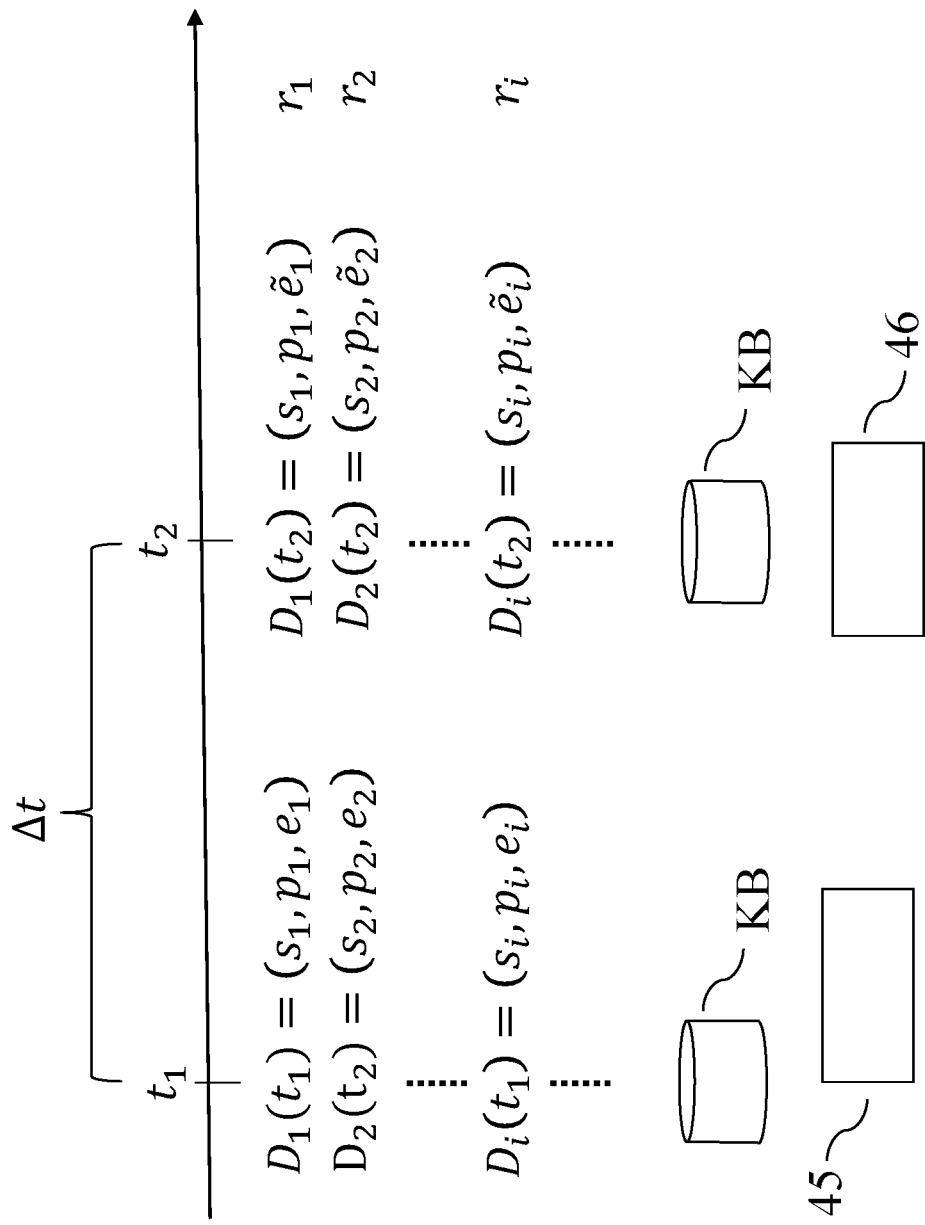
FIG. 1 shows, schematically, a change over time of entries in the knowledge base.

FIG. 1 shows a knowledge base KB and its entries $D_1$, $D_2, \ldots, D_i$ at a first point in time $t_1$ and a second point in time $t_2$, which are separated from each other by a time interval $\Delta t$, i.e., $t_2 = t_2 + \Delta t$.

To begin with, the entries at first point in time $t_1$ will be described. A first entry $D_1(t_1) = (s_1, p_1, e_1)$ includes a first identification of a first entity $s_1$ (also known as "subject"), a first property identifier $p_1$ of a first property, and a first expression $e_1$ of this first property $p_1$. (Identification or identifier or identified are used interchangeably in the following text). A second entry $D_2(t_1) = (s_2, p_2, e_2)$ includes a second identification of a second entity $s_2$ (this second identification of second entity $s_2$ may be identical to the first identification of first entity $s_1$), a second property identifier of a second property $p_2$ (this second property identifier of second property $p_2$ may be identical to the first property identifier of first property $p_1$), and a second expression $e_2$ of this second property $p_2$ (this second expression $e_2$ may be identical to first expression $e_1$).

A general entry of knowledge base KB at first point in time $t_1$ is denoted by $D_1(t_1) = (s_1, p_1, e_1)$. The entries of knowledge base KB are also denoted without indexes as (s,p,e) in a simplified form.

At second point in time $t_2$, entity $s_1$, $s_2$, $s_i$ and property identifier $p_1$, $p_2$, $p_i$ are unchanged for first entry $D_1$, second entry $D_2$ and generic entry $D_i$ of knowledge base KB in comparison with first point in time $t_1$. However, expression $e_1$, $e_2$, $e_i$ of the respective property may possibly have changed in comparison with second point in time $t_2$ and is therefore denoted by $\tilde{e}_1, \tilde{e}_2, \tilde{e}_i$. Here, only those entries are taken into account for which corresponding entries are present in knowledge base KB both at first point in time $t_1$ and second point in time $t_2$.

A respective robustness variable $r_1, r_2, r_i$, which indicates whether the expression $e_1, e_2, e_i$ present at respective first point in time $t_1$ and the respective expression $\tilde{e}_1, \tilde{e}_2, \tilde{e}_i$ present at second point in time $t_2$ differ, is now ascertained for each one of these entries $D_1, D_2, D_i$. This respective robustness variable $r_1, r_2, r_i$ may optionally be stored in knowledge base KB in a form linked with respective entry $D_1, D_2, D_i$. Now, a computer-implemented classifier such as a logistic regression is trained, i.e. parameters that characterize it are adapted, in such a way that a mapping $f:(s,p,e) \rightarrow r$ for all triples (s,p,e) made up of entity s, property identifier p, and expression e of this property at first point in time $t_1$ is learned. In particular, it is now possible to apply mapping f learned in this way to all entries of knowledge base KB even if an entry in knowledge base KB existed only at a single point in time. More specifically, this mapping f learned in such a way allows a prediction of a robustness variable over future time interval $\Delta t$, or put another way, $r = f(s,p,e)$ characterizes whether or not the respective entry is robust.

The described method is able to be carried out by a computer 45, for instance in that a corresponding computer program is provided which includes instructions that when executed by computer 45, induce it to carry out the described method. This computer program is able to be stored in a machine-readable memory medium 46, for instance.

Figure 2:
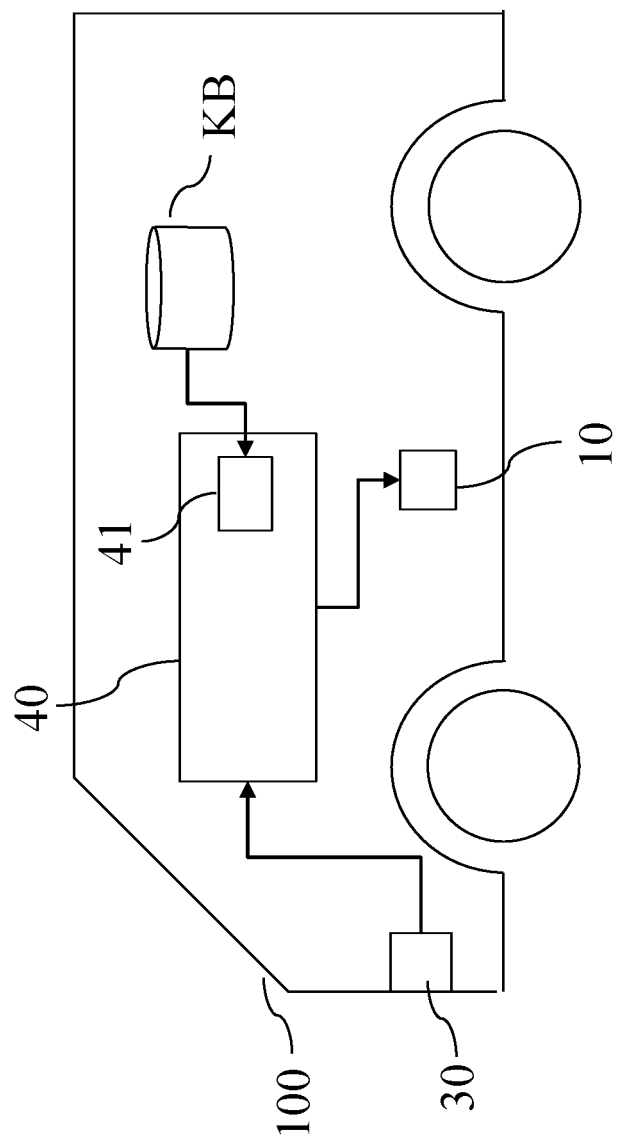
FIG. 2 shows, schematically, a possible application of a method for predicting the stability over time of entries in the knowledge base.

FIG. 2 shows an application of the classifier trained in this way, which has been provided with reference numeral 41 in FIG. 2. FIG. 2 shows an in particular at least partially autonomous vehicle 100, which ascertains in a planning computer 40 a trajectory to be traveled in the future such as a route on a map, as a function of variables detected by a sensor 30 and knowledge base KB. Points of interest on the map, e.g. that a gas station exists at a certain address, are supplied by knowledge base KB. Classifier 41 now provides that the persistence over time of the entries be estimated over a future time interval $\Delta t$. For instance, if the information of the existence of the gas station is judged to be unreliable, this information will not be taken into account for the route planning and the route is planned as a function of the available information in knowledge base KB deemed to be reliable. Vehicle 100 is then guided along this scheduled route, optionally by a corresponding actuation of actuators 10. Alternatively or additionally, the route is able to be displayed to a driver of vehicle 100. The described method may be implemented with the aid of a computer program that is stored on the machine-readable memory medium (46).

The term "computer" includes any device for processing specifiable computation rules. These computation rules may be present in the form of software or in the form of hardware or also in a mixed form of software and hardware.

The invention claimed is:

1. A method for the automated control of an at least partially autonomous robot, the method comprising:
   ascertaining a route, using a navigation system, as a function of at least one entry of a knowledge base including a first triple of an entity, a property identifier of a property of the entity, and an expression of the property, the route being ascertained as a function of a prediction of a persistence of the property; and
   controlling the robot along at least one section of the ascertained route.

2. The method as recited in claim 1, wherein the robot is a motor vehicle.

3. The method of claim 1, wherein the knowledge base include a plurality of triples of entities, respective property identifiers of respective properties of the entities, and expressions of the respective properties, and wherein the method further comprises:
   predicting, using a trained classifier, the persistence of the property of the first triple;
   wherein the classifier is trained as a function of a plurality of triples that are present in the knowledge base at two different times separated by a time interval, to output an output variable that characterizes, for a predefined triple, whether or not the expression of the predefined triple is stable over the time interval.

4. The method as recited in claim 3, wherein a 4-tuple including the predefined triple and an associated persistence prediction is made available in the knowledge base.

5. The method as recited in claim 1, wherein the classifier is trained as a function of whether or not the expressions of the triples that are present in the knowledge base at the two different points in time assume the same value.

6. The method as recited in claim 5, wherein the classifier includes a logistic regression, parameters of logistic regressing being adapted during the training.

7. The method as recited in claim 1, wherein the first triple is not taken into account for ascertaining the route if the prediction shows that information included in the first triple is not persistent.

8. A device, comprising:
   a computer configured to automatically control of an at least partially autonomous robot, the computer configured to:
   ascertain a route, using a navigation system, as a function of at least one entry of a knowledge base including a first triple of an entity, a property identifier of a property of the entity, and an expression of the property, the route being ascertained as a function of a prediction of a persistence of the property; and
control the robot along at least one section of the ascertained route.

9. The device of claim 8, wherein the knowledge base include a plurality of triples of entities, respective property identifiers of respective properties of the entities, and expressions of the respective properties, and wherein the computer is further configured to predict, using a trained classifier, the persistence of the property of the entity of the first triple, wherein the classifier is trained as a function of a plurality of triples that are present in the knowledge data at two different times separated by a time interval, to output an output variable that characterizes, for a predefined triple, whether or not the expression of the predefined triple is stable over the time interval.

10. A non-transitory machine-readable memory medium on which is stored a computer program for the automated control of an at least partially autonomous robot, the computer program, when executed by a computer, causing the computer to perform the following steps:

ascertaining a route, using a navigation system, as a function of at least one entry of a knowledge base including a first triple of an entity, a property identifier of a property of the entity, and an expression of the property, the route being ascertained as a function of a prediction of a persistence of the property; and
controlling the robot along at least one section of the ascertained route.

11. The non-transitory machine-readable memory medium of claim 10, wherein the knowledge base include a plurality of triples of entities, respective property identifiers of respective properties of the entities, and expressions of the respective properties, and wherein computer program, when executed by the computer, further causes the computer to perform:
predicting, using a trained classifier, the persistence of the property of the entity of the first triple;
wherein the classifier is trained as a function of a plurality of triples that are present in the knowledge data at two different times separated by a time interval, to output an output variable that characterizes, for a predefined triple, whether or not the expression of the predefined triple is stable over the time interval.

* * * * *